(12) United States Patent
Parazynski et al.

(10) Patent No.: US 9,528,233 B2
(45) Date of Patent: Dec. 27, 2016

(54) PET WASTE COLLECTION AND ISOLATING DEVICE

(71) Applicants: Scott Edward Parazynski, Houston, TX (US); Matthew Scott Jackson, Houston, TX (US)

(72) Inventors: Scott Edward Parazynski, Houston, TX (US); Matthew Scott Jackson, Houston, TX (US)

( * ) Notice: Subject to any disclaimer, the term of this patent is extended or adjusted under 35 U.S.C. 154(b) by 0 days.

(21) Appl. No.: 15/136,905

(22) Filed: Apr. 23, 2016

(65) Prior Publication Data

US 2016/0312420 A1    Oct. 27, 2016

Related U.S. Application Data

(60) Provisional application No. 62/153,177, filed on Apr. 27, 2015.

(51) Int. Cl.
```
E01H 1/12      (2006.01)
A01K 29/00     (2006.01)
B25G 1/00      (2006.01)
```

(52) U.S. Cl.
CPC ............. *E01H 1/1206* (2013.01); *A01K 29/00* (2013.01); *B25G 1/00* (2013.01); *E01H 2001/1226* (2013.01); *E01H 2001/1266* (2013.01)

(58) Field of Classification Search
CPC .......... E01H 1/1206; E01H 2001/1226; E01H 2001/1266; E01H 2001/1246; A01K 29/00; B25G 1/00
USPC .................................................. 294/1.3, 1.4
See application file for complete search history.

(56) References Cited

U.S. PATENT DOCUMENTS

| | | | |
|---|---|---|---|
| 3,718,358 A * | 2/1973 | Ayers | A47L 13/52 294/1.4 |
| 3,823,970 A * | 7/1974 | Brenner | E01H 1/1206 294/1.4 |
| 3,984,139 A * | 10/1976 | Battaglia | E01H 1/1206 294/1.4 |
| 4,105,241 A * | 8/1978 | Mee | B66C 1/66 294/74 |
| 4,477,111 A | 10/1984 | Crooks | |
| 4,776,621 A * | 10/1988 | Streit | E01H 1/1206 294/1.4 |
| 5,562,319 A * | 10/1996 | Kohler | E01H 1/1206 294/1.4 |
| 5,628,537 A | 5/1997 | Kriemer | |
| 6,305,322 B1 | 10/2001 | Patel | |
| 6,641,188 B2 | 11/2003 | Arceo | |
| 7,080,863 B2 * | 7/2006 | Cappellano | E01H 1/1206 294/1.4 |
| 7,261,347 B2 | 8/2007 | Krieger | |

(Continued)

*Primary Examiner* — Dean Kramer
(74) *Attorney, Agent, or Firm* — Steven H Greenfield; Greenfield Inventory and Patent Consulting, Inc.

(57) ABSTRACT

Devices and methods for collecting pet droppings into bags and disposing of them in a way that the user and equipment avoid contact with the droppings are disclosed. In one embodiment, the mouth of an open bag is placed over the dropping and elastic cords manipulated by a remote handle wrap around the waste bag and closes its opening to snare the droppings. In another embodiment, two jaws are configured for sideways movement and to close over the dropping by a remote handle. A collection bag is placed inside the jaws with its rim wrapped around the jaws in a way that closing the jaws ensnares the droppings inside the bag.

15 Claims, 17 Drawing Sheets

(56) References Cited

U.S. PATENT DOCUMENTS 7,625,025 B1 * 12/2009 Zahedi .................. E01H 1/1206
  294/1.3
7,628,431 B2    12/2009 Evans et al.

* cited by examiner

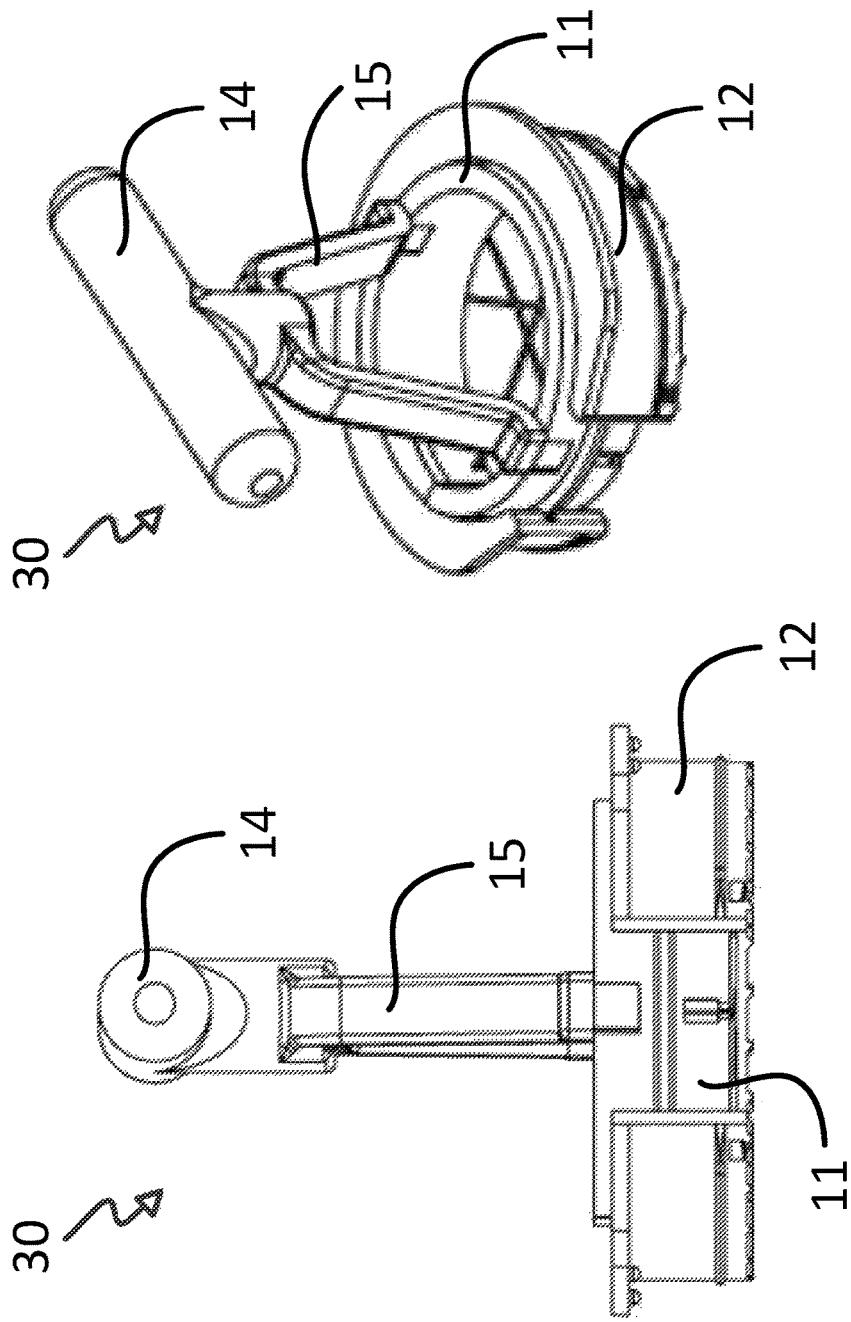

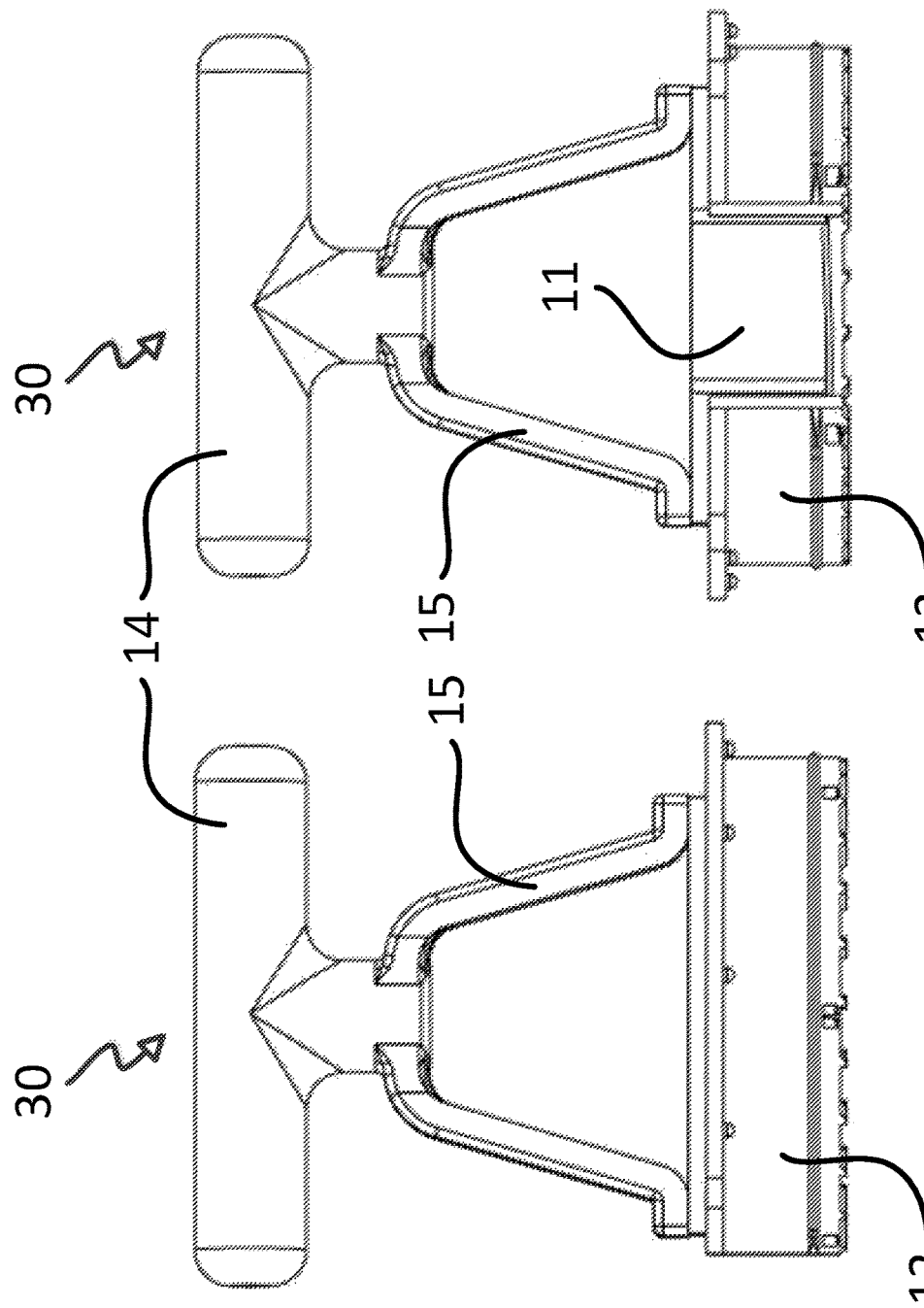

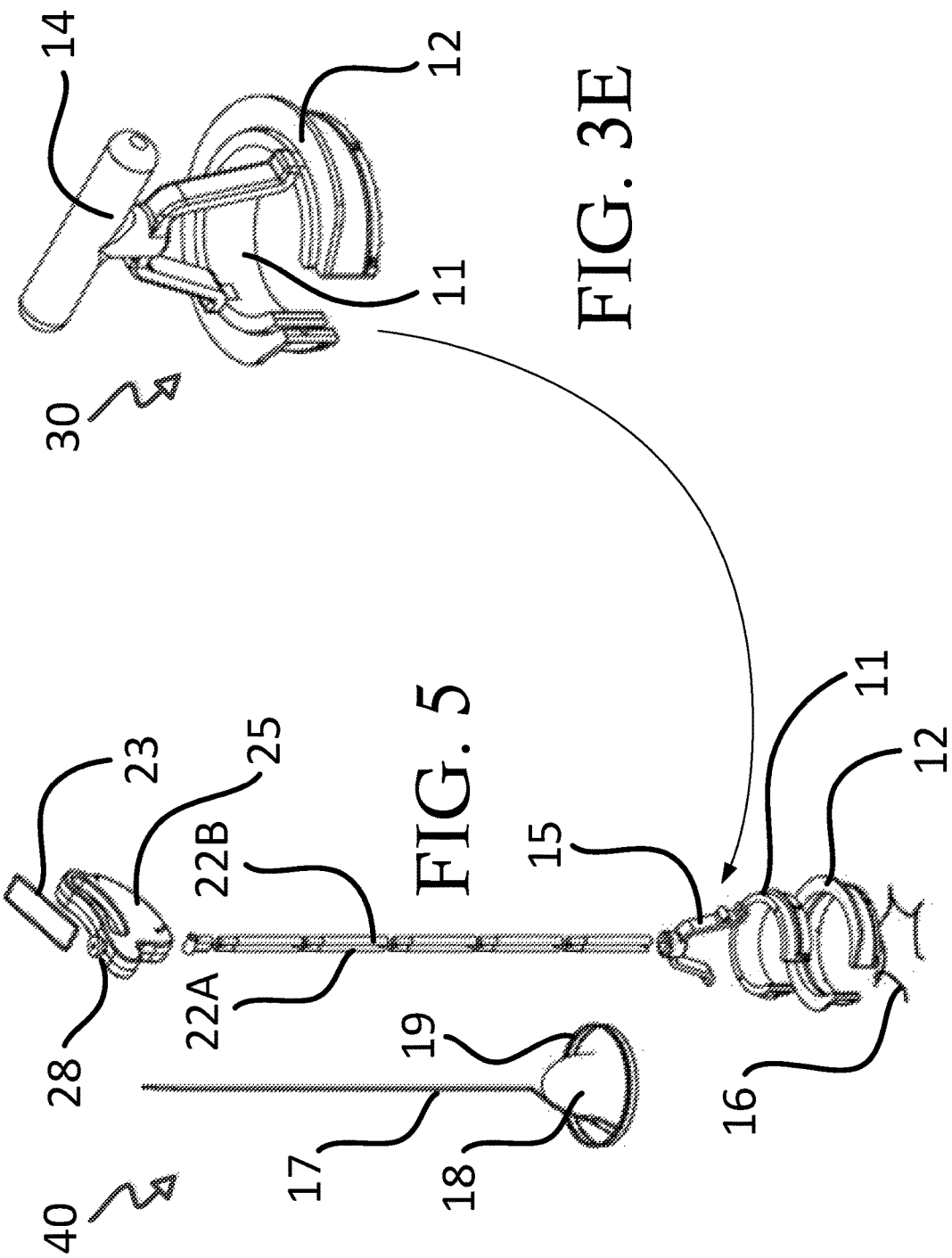

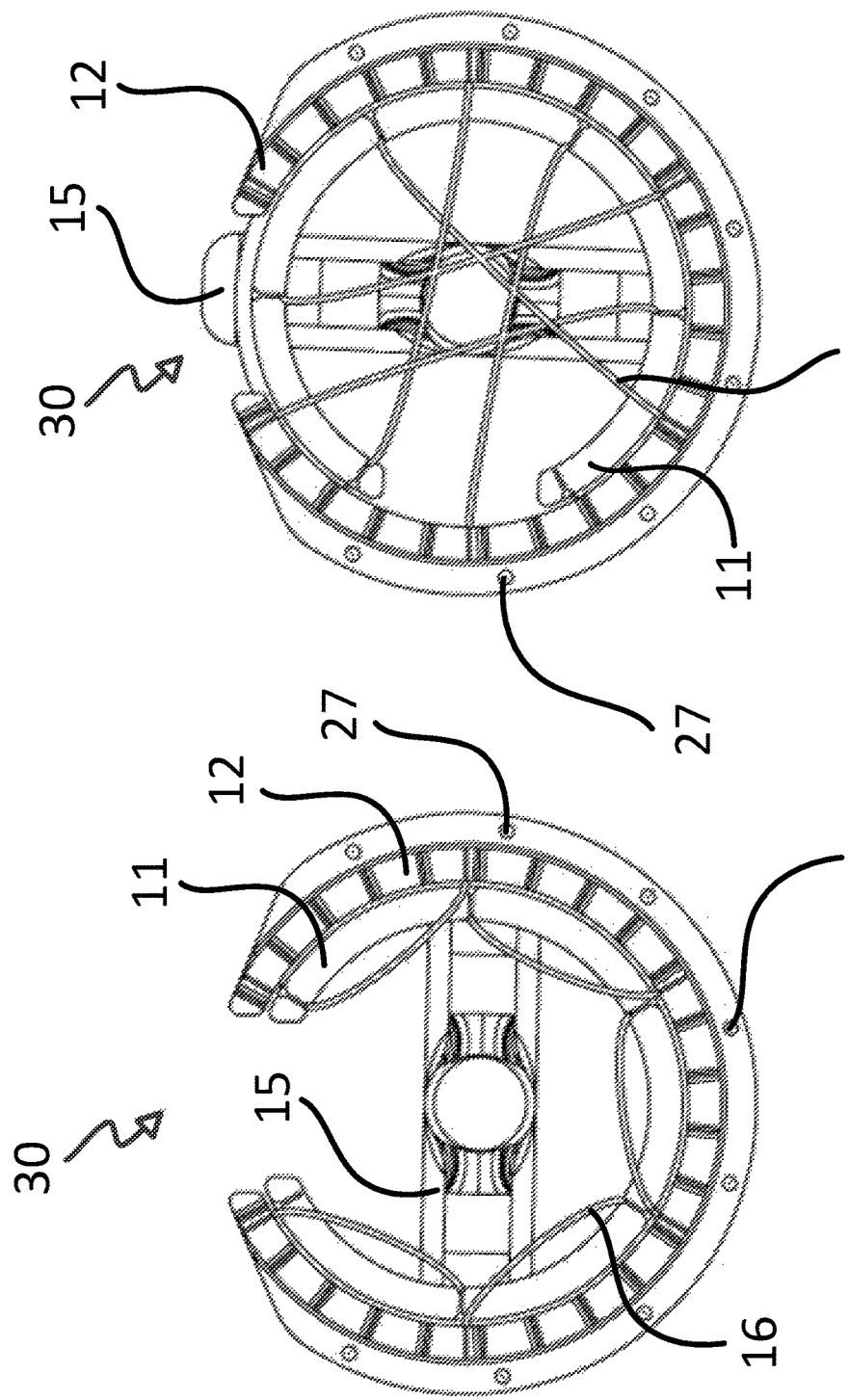

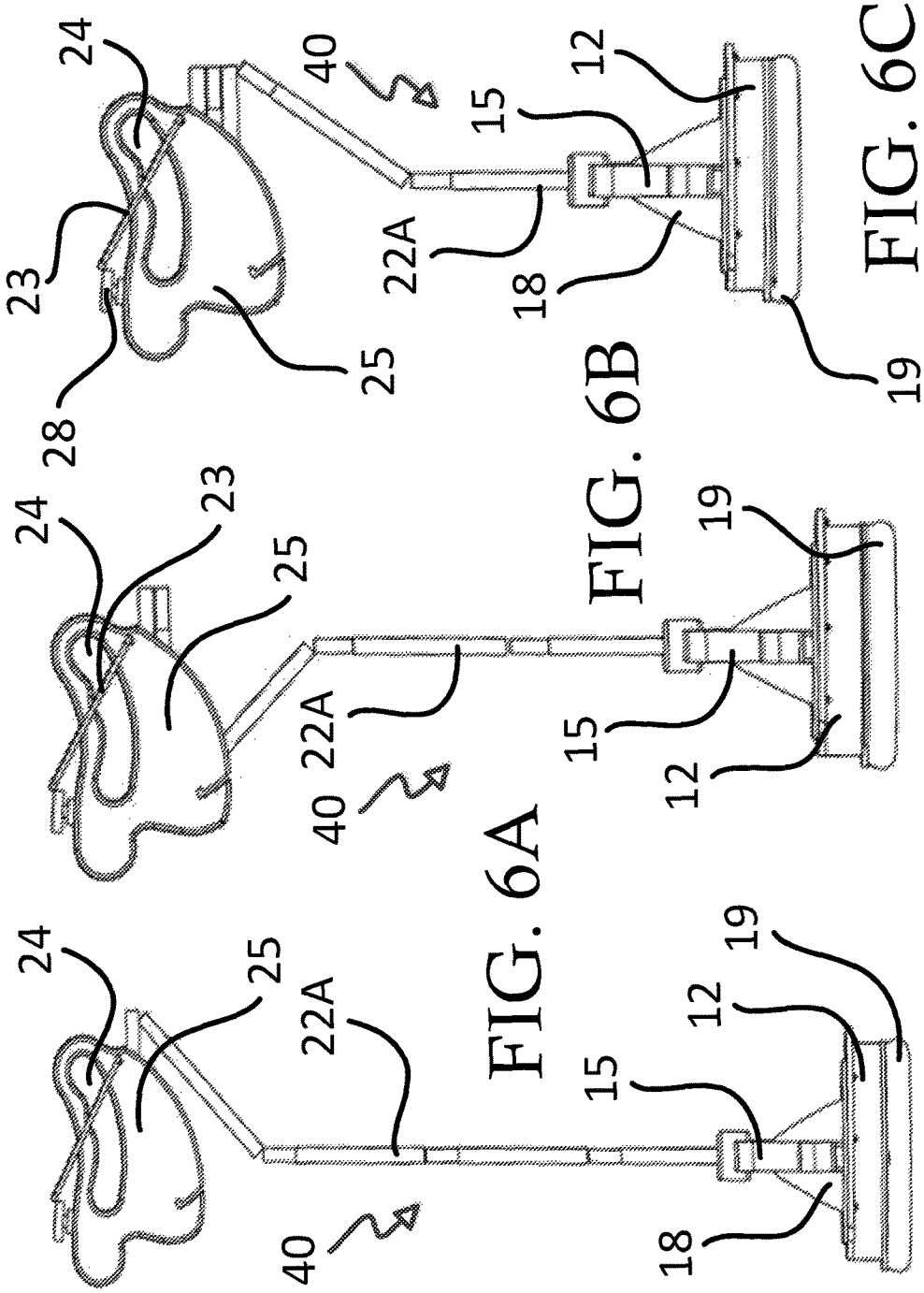

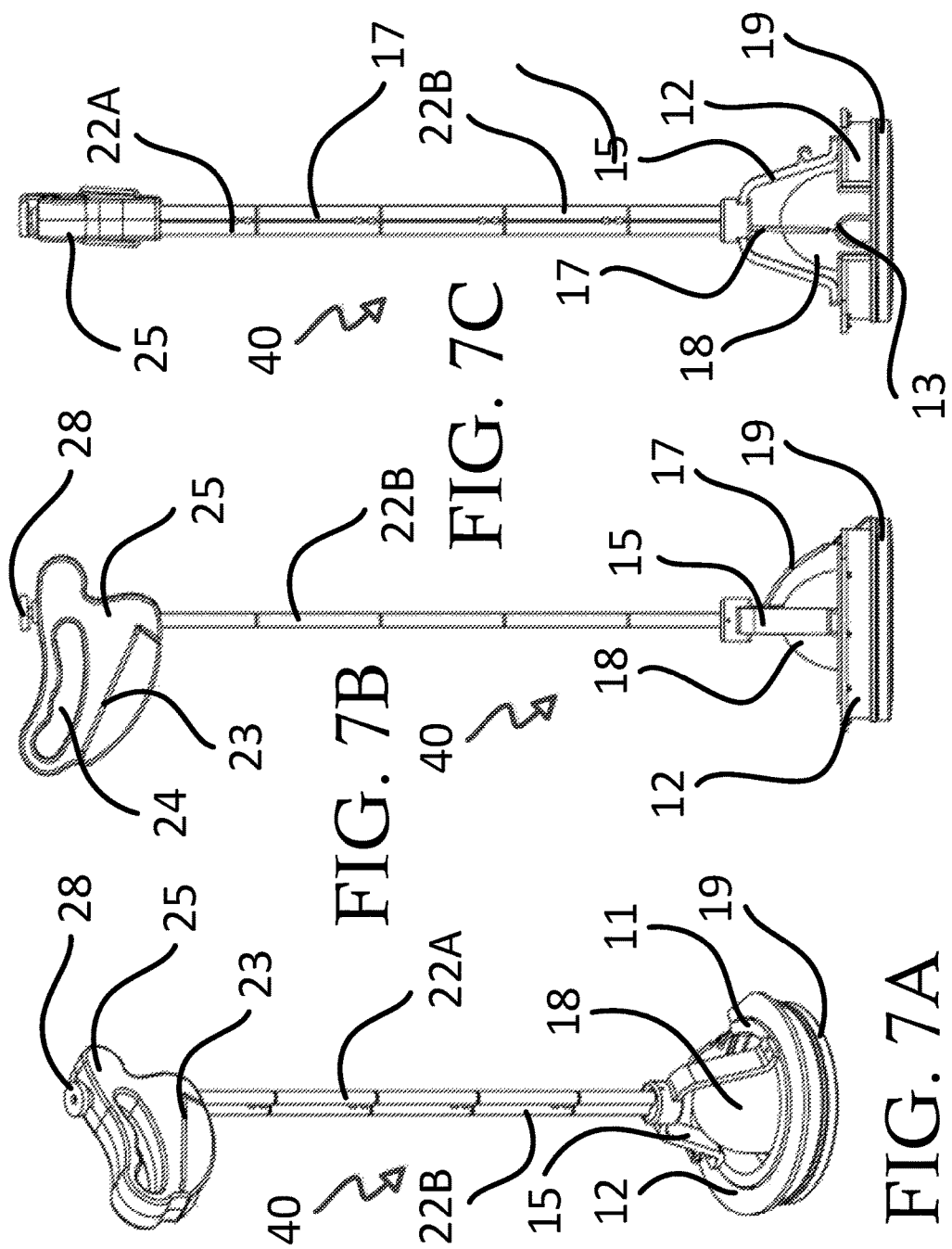

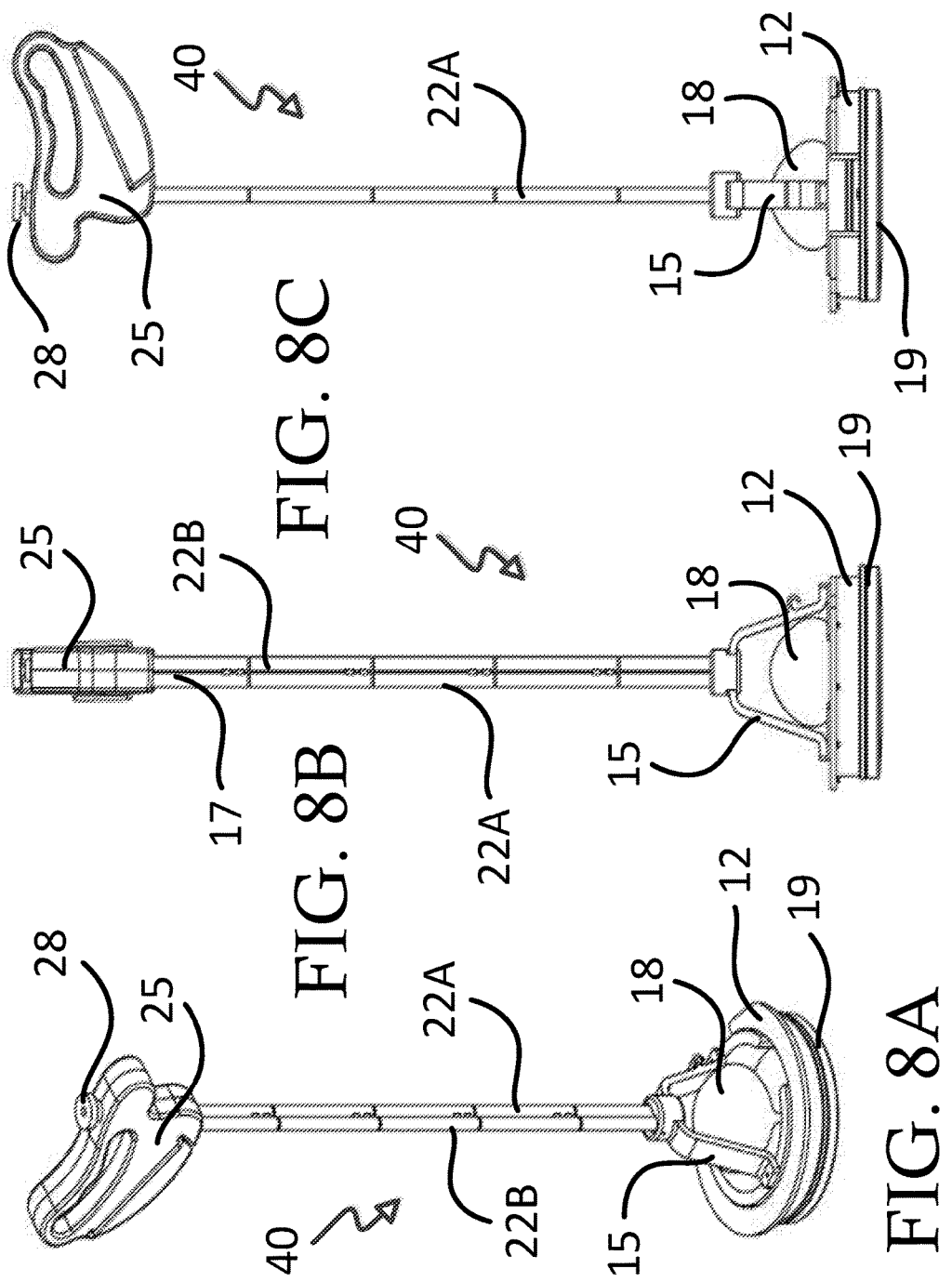

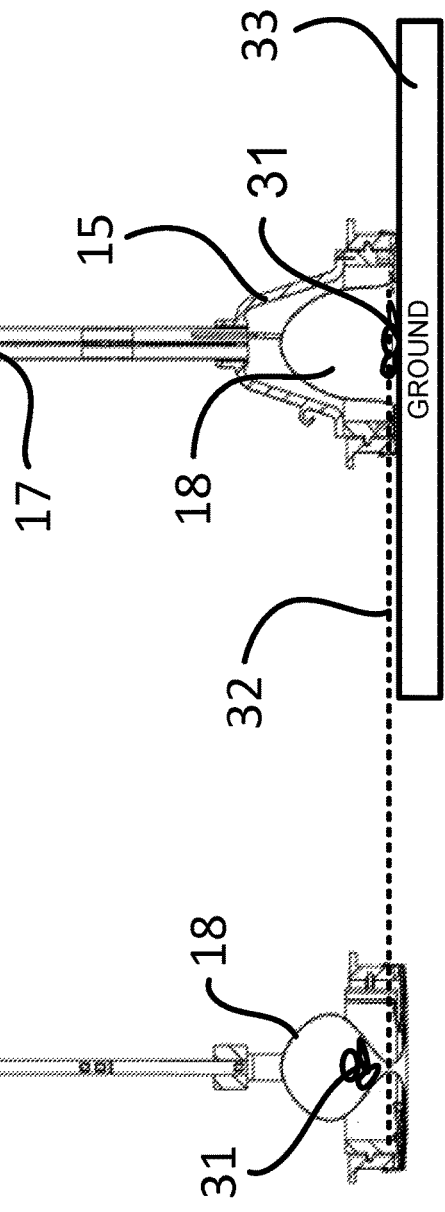
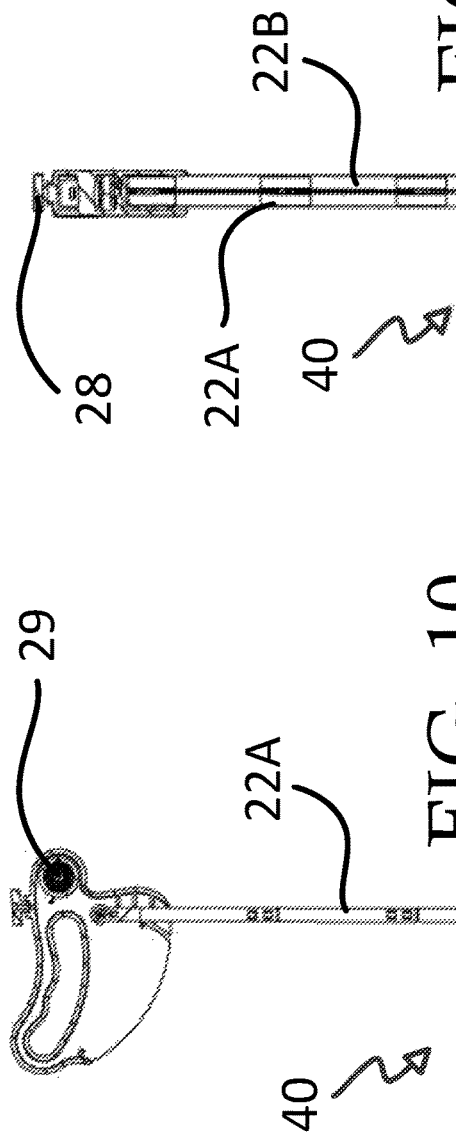

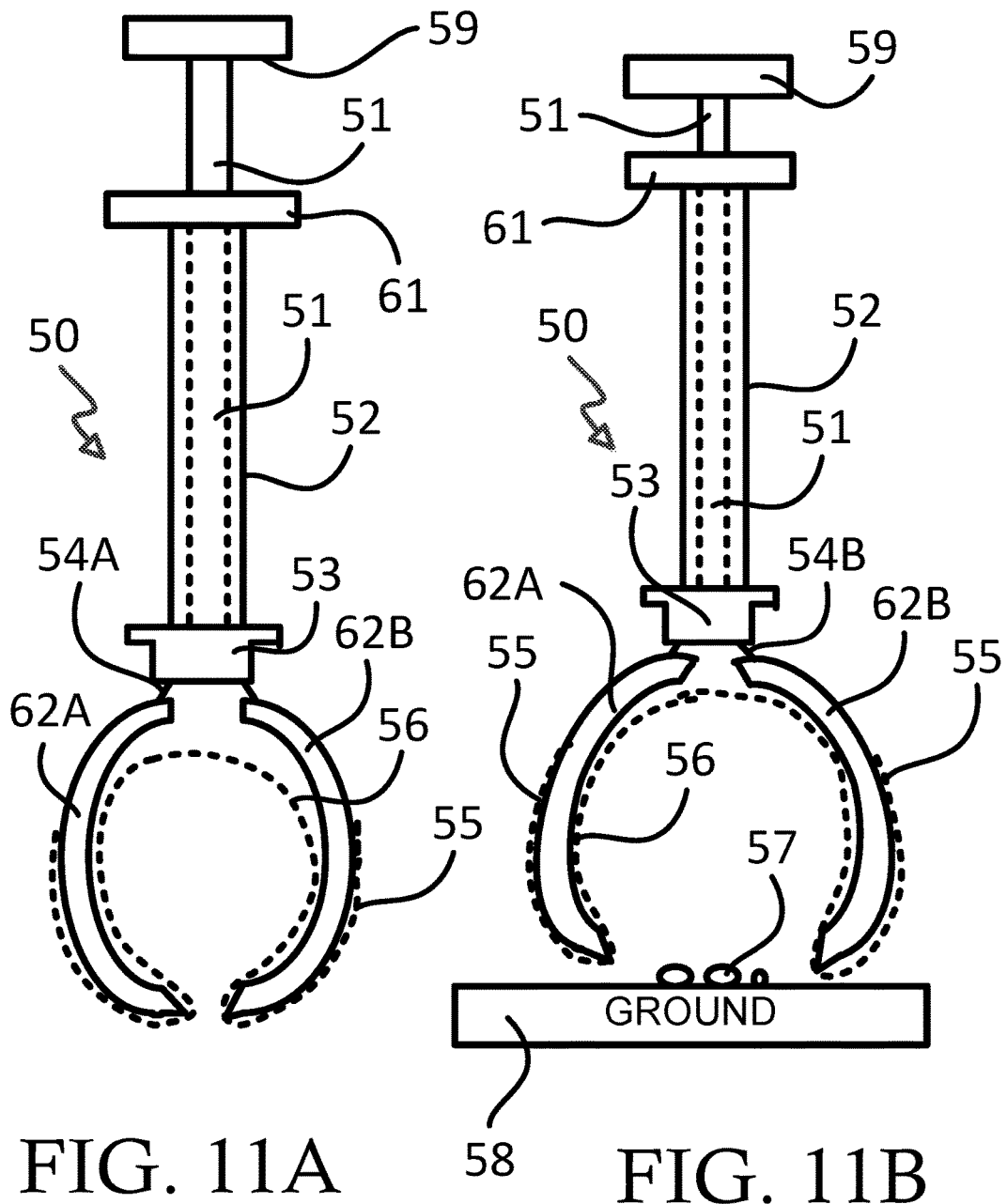

PET WASTE COLLECTION AND ISOLATING DEVICE

RELATED APPLICATIONS

This application claims priority from provisional application No. 62/153,177 filed on Apr. 27, 2015.

FIELD OF THE INVENTION

The present invention relates to devices for picking up pet waste without requiring the user to come in contact with the animal waste. In another version, a longer handle enables the user to pick up the waste from a distance and without having to stoop over.

The devices are configured to avoid the risk of fecal contamination of the device or the user. More specifically, the present invention relates to devices for picking up dog feces left on outside ground surfaces such as asphalt, concrete, grass, foliage or snow as well as indoor surfaces such as floors and carpeting, and collecting the waste remotely and without coming in contact with it. Furthermore, the devices may be utilized for picking up the feces of other domesticated and farm animals such as cats, rabbits, cows or horses as well as other hazardous or unpleasant materials e.g., nuclear, chemical, biological, medical or odiferous waste products.

BACKGROUND OF THE INVENTION

Pets provide a great deal of joy and companionship to persons of all ages, including the elderly and infirm. Many types of devices have been developed to facilitate pickup, removal, as well as disposal of fecal matter. Many of these devices are hand-held and require a user to have to bend down to the ground to pick up or scoop up the fecal matter using the device. For the elderly, the infirm and those with back problems, hand-held fecal matter pickup devices are a less than desirable solution. Moreover, any direct contact with waste material could result in illness.

A large number of patents and publications relate to pet waste scooping devices. Some of the embodiments comprise a pair of movable scoop jaws attached to a long handle configured to manipulate the jaws under the feces and actuate the jaws to entrap the waste. Bags are used with some of these devices; however, providing for mechanisms to cleanly close and remove such bags without feces contamination has been an issue and remains largely unresolved.

U.S. Pat. No. 7,628,431 relates to a device for removing canine fecal matter that includes a lobed knob connected by concentric tubes to a dual housing. U.S. Pat. No. 7,261,347 provides structures for orienting a container for scooping up waste, and various structures for sealing such a container. U.S. Pat. No. 6,641,188 teaches an animal waste scooper device comprising a hand grip on one end of a shaft and a scoop with an openable door and a removable bag at the opposite end. The device described in U.S. Pat. No. 6,305,322 contains a claw having four arms in which a bag is placed. Both U.S. Pat. No. 5,628,537 and U.S. Pat. No. 4,477,111 use jaws arrangements encased by a bag.

Two embodiments of pet collection and isolation devices are presented for this invention. Both embodiments provide for the remote manipulation of the waste using a bag and closing the bag around the feces such that the user does not come in contact with the feces and the device remains uncontaminated. The first embodiment uses a cord ensnaring mechanism while the second provides a mechanism for moving jaws encased by a bag under the feces and closing the bag around them.

SUMMARY OF THE PRESENT INVENTION

In one aspect of the present invention, a device for collecting and isolating pet droppings comprises: a ring assembly comprising an outer ring and an inner ring, the inner ring being configured for fitting inside and rotating inside the outer ring, the outer ring having an open section and the inner ring having an open section; a turning bar assembly attached to a top portion of the inner ring, the turning bar assembly creating a space above the ring assembly; a handle member attached to the bar assembly, the handle member being configured for turning the inner ring; a plurality of elastic cords, the each elastic cord having a first end and a second end, wherein the first end of each cord is attached to a groove at the bottom surface of the inner ring while the other end is attached to a groove disposed at the bottom surface of the outer ring, the cords being arranged in succession of one another; and a waste collection bag, the waste collection bag having a rim around an opening, the bag being held open by means of affixing the rim to a bottom portion of the device for collecting and isolating pet droppings, the waste collection bag having walls that occupy the space above the ring assembly, wherein turning the handle member is configured to actuate the turning bar assembly to rotate the inner ring inside the outer ring that in turn actuate the cords to twist around the mouth of the bag, pinching the mouth of the bag and closing the bag.

In another aspect of the present invention, a method for collecting and isolating pet droppings comprises: placing a mouth of a bag over a surface onto which pet droppings were deposited; turning a handle member to actuate turning a ring containing a plurality of cords, wherein movement of the ring causes the cords to twist around and pinch the mouth of the bag under the pet droppings; snaring the dropping into the bag; and removing and disposing of the bag with the dropping.

In yet another aspect of the present invention, a device for collecting and isolating pet droppings comprises: a first jaw and a second jaw, the first jaw and second jaw being attached at an upper end to hinged arms, the hinged arms being actuated by a piston in a manner that the piston, when pressed downward, pushes the first jaw sideways away from the second jaw and pushes the second jaw sideways away from the first jaw, and in a manner that the piston, when pulled upward, pulls the first and second jaws inwardly toward each other; and a bag wrapped from an outside of the first jaw and around the first jaw, rounding into an inner space between the first and second jaws and wrapping from the inner space to around the outside of the second jaw in a way that an inner space of the bag is disposed between the jaws and an opening of a bag is disposed at a bottom side of the jaws in a manner that placing an area between a widely spaced first jaw and second jaw over a surface onto which pet droppings are deposited and pulling the piston upwardly closes the jaws and the bag under the droppings causing the droppings to be ensnared and contained inside a closed bag;

These and other features, aspects and advantages of the present invention will become better understood with reference to the following drawings, description and claims.

BRIEF DESCRIPTION OF THE DRAWINGS

FIG. 3A is a side view of an assembly of the ring components of the pet waste collection and isolation device of FIG. 1 in a first position according to a first embodiment of the present invention;

FIG. 3B is a top perspective view of an assembly of the ring components of the pet waste collection and isolation device of FIG. 1 in a first position according to a first embodiment of the present invention;

FIG. 3C is a rear view of an assembly of the ring components of the pet waste collection and isolation device of FIG. 1 in a second position according to a first embodiment of the present invention;

FIG. 3D is a front view of an assembly of the ring components of the pet waste collection and isolation device of FIG. 1 in a second position according to a first embodiment of the present invention;

FIG. 3E is a top perspective view of an assembly of the ring components of the pet waste collection and isolation device of FIG. 1 in a second position according to a first embodiment of the present invention;

FIG. 4A is a bottom view of an assembly of the ring components of the pet waste collection and isolation device of FIG. 1 in a first position according to a first embodiment of the present invention;

FIG. 4B is a bottom view of an assembly of the ring components of the pet waste collection and isolation device of FIG. 1 in a second position according to a first embodiment of the present invention;

FIG. 5 presents an exploded view of a pet waste collection and isolation device assembly according to a first embodiment of the present invention;

FIGS. 6A-6C are side views of the pet waste collection and isolation device assembly shown in successive folded configurations according to a first embodiment of the present invention;

FIGS. 7A-7E show the pet waste collection and isolation device assembly in a ready to use mode in frontal, side and sectional views according to a first embodiment of the present invention;

FIGS. 8A-8C show the pet waste collection and isolation device following the pickup of the droppings in frontal and side views according to a first embodiment of the present invention;

FIGS. 9 and 10 show the pet waste collection and isolation device following the pickup of the droppings in sectional views according to a first embodiment of the present invention;

FIGS. 11A-11C show the pet waste collection and isolation device in use mode in front sectional views according to a second embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention relates to a device for collecting solid animal waste deposited on various outdoor surfaces such as asphalt, concrete, grass, foliage or snow by canines and isolating the waste in a bag in a way that avoids contamination of the device and the user and keeps the user from coming in contact or in close proximity with the waste. While useful for collecting waste deposited by dogs in the course of their walk, the use of the device may extend to picking up waste of other pets such as from litter boxes, accidental droppings onto a carpet or floor, or from the environment of these pets.

Figure 11C:
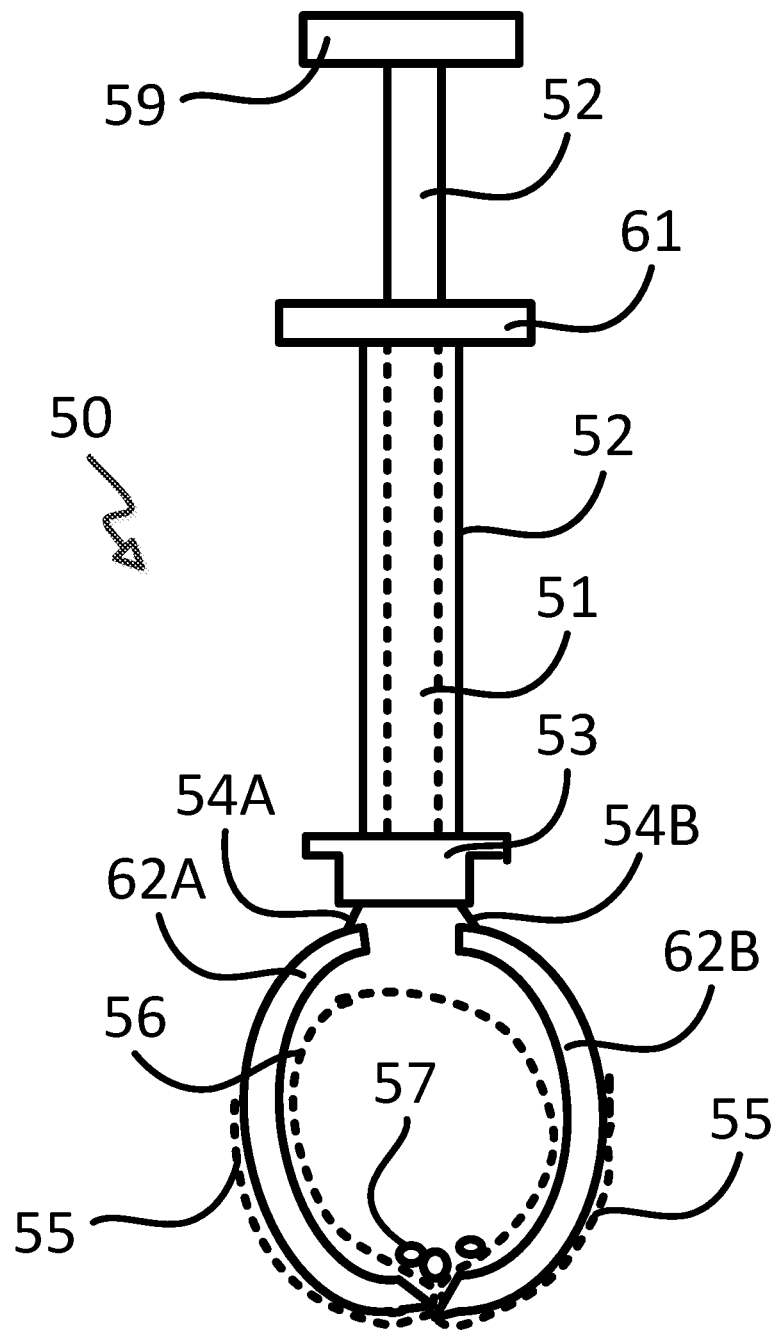

Drawings 1-10 and 12-15 depict a first embodiment of the device while FIGS. 11A-11C illustrate a second embodiment of the device for collecting and isolating pet waste.

Figure 1:
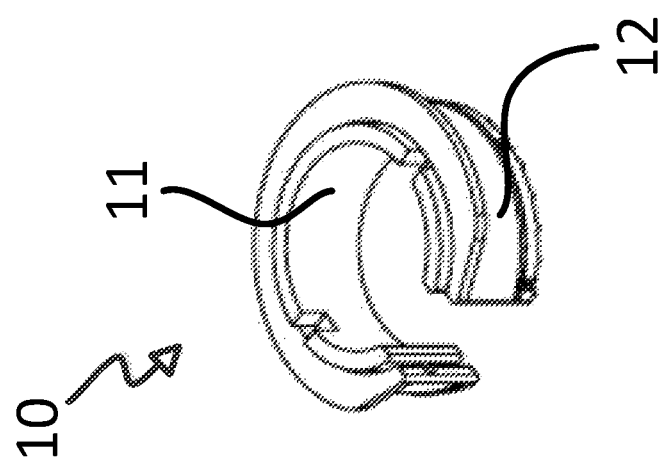
FIG. 1 is a perspective view of ring components of the pet waste collection and isolation device according to a first embodiment of the present invention.
Figures 6D, 6E:
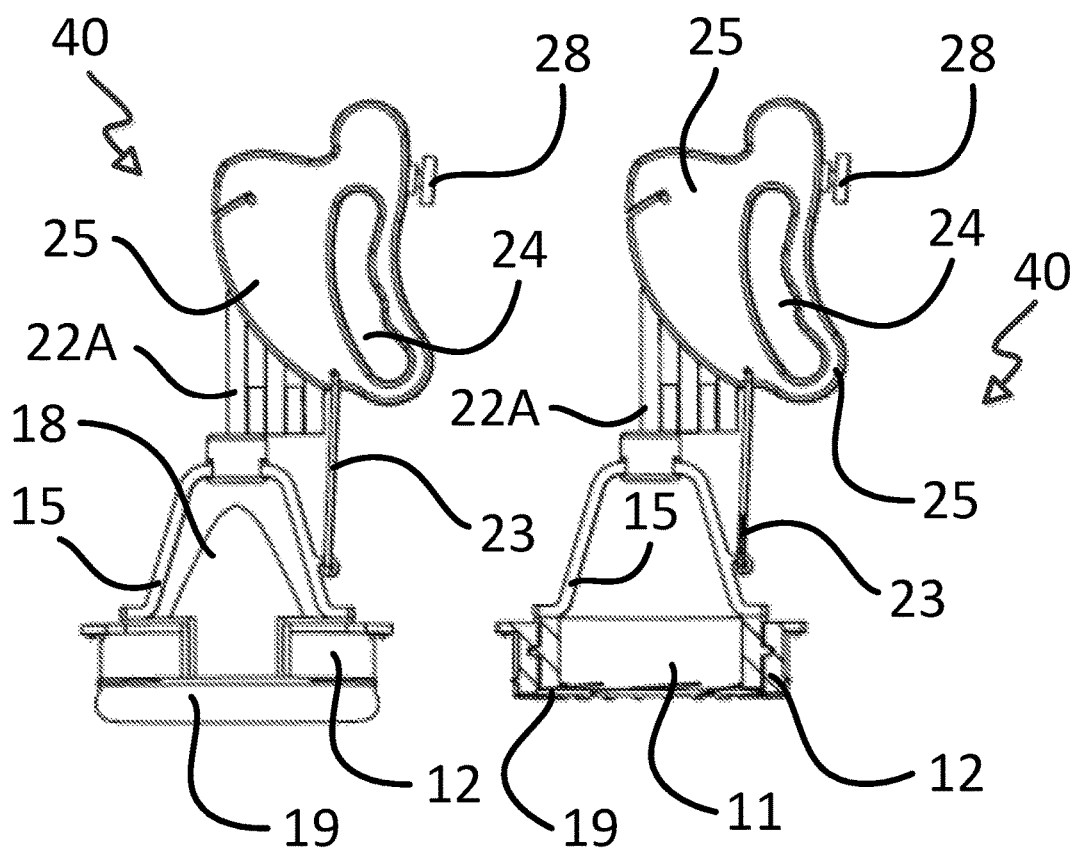
FIGS. 6D-6F are front views of the pet waste collection and isolation device assembly shown in fully folded configurations according to a first embodiment of the present invention.
Figure 6F:
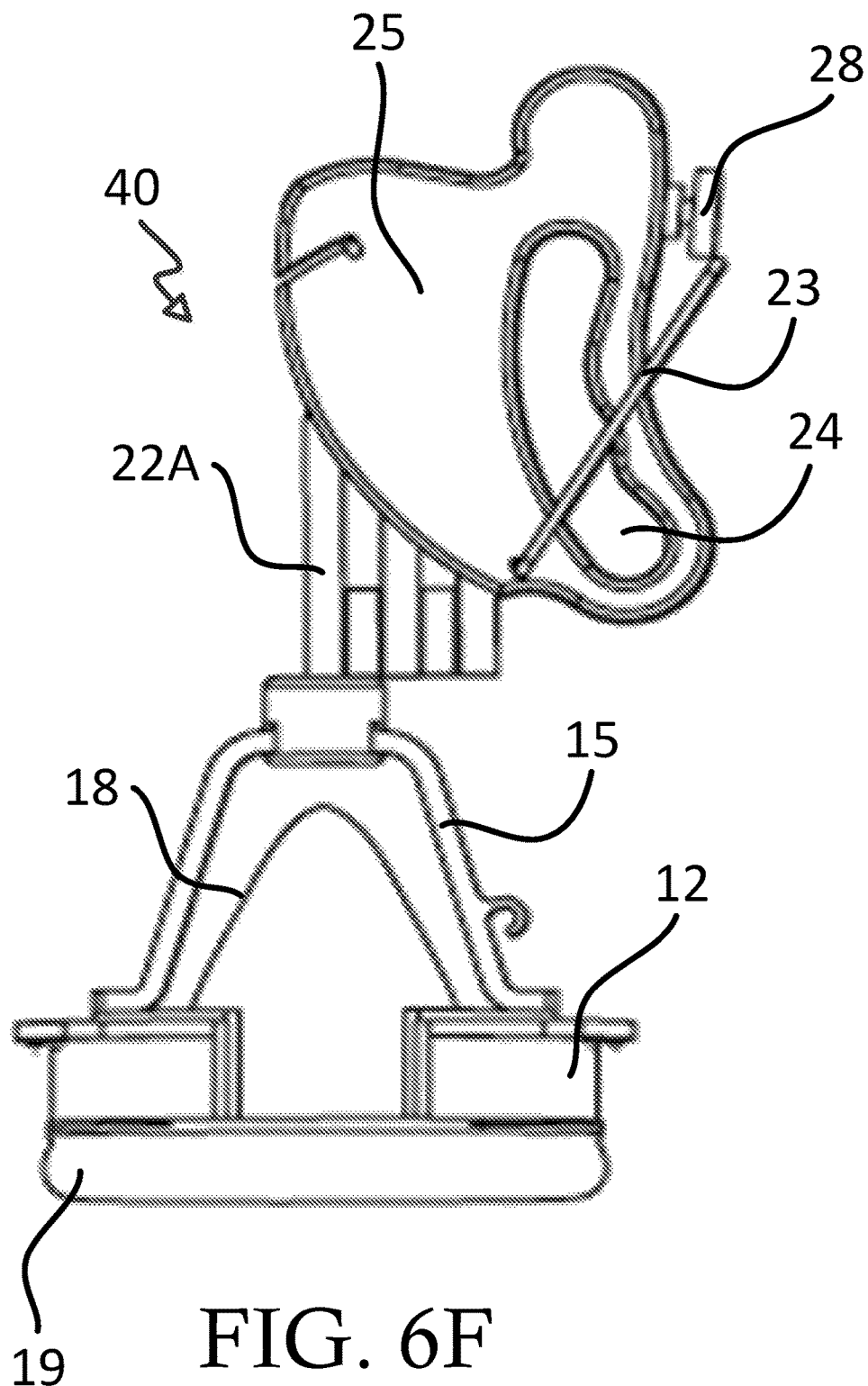

The first embodiment of the device comprises an inner ring 11 adapted to fit inside an outer ring 12 in an assembly 10 as shown in FIG. 1. The inner ring 11 is also adapted to rotate inside the outer ring 12. Both the inner ring 11 and the outer ring 12 have about a 30-45 degree sections removed which creates openings in both rings. The two positions are shown in Figure set 3 and Figure set 4. In the first position, the openings of the two rings 11 and 12 are aligned. In the second position, the inner ring 11 is turned about 90 degrees in a way that closes the opening of the outer ring 12.

Figure 2:
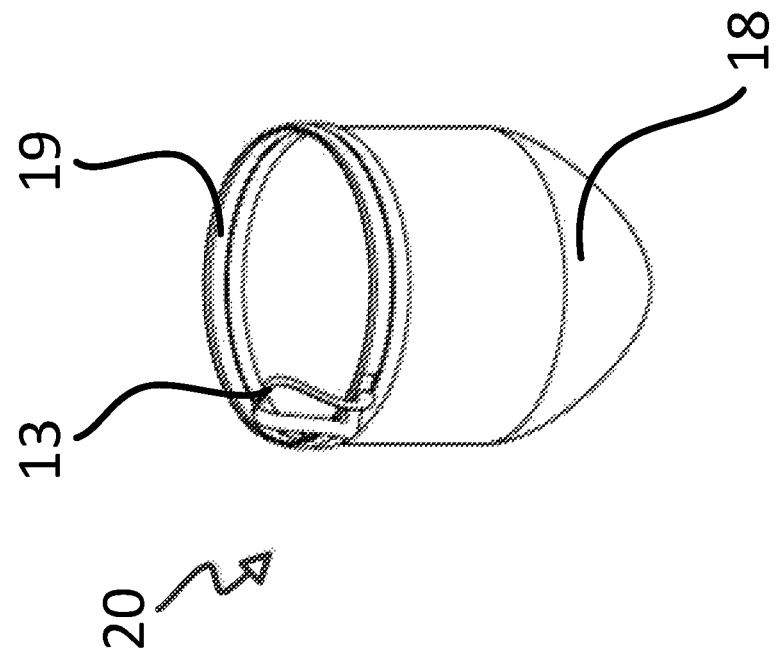
FIG. 2 is a perspective view of a bag and cinching components of the pet waste collection and isolation device according to a first embodiment of the present invention.

FIG. 2 shows one version for the bag 18 that will be used for entrapping and holding the waste. The bag 18 is made of a sturdy material similar to that of a ziplock bag that holds its shape when spread apart and in an open position, yet sufficiently pliable that the mouth can be closed by an outside twisting force applied to its walls. The lip of the bag 18 is placed around the outside of the loop assembly 20. The loop assembly 20 contains a rim 19, the bag 18 and a clip 13. The bag 18 may be held up by an integral elastic band over a protuberance on the loop 20. The second step may be to push the apex of the bag up through the loop 20 and everting it into the center of the capture envelope. The user would then attach a clip 13 to the cinch feature of the bag 18.

FIGS. 3A-3E show one version of the first embodiment of the assembly 30 for ensnaring the pet waste. Rotating bars 15 are attached to the inner ring 11 and a handle member 14 is attached to the rotating bars. Turning the handle member 14 actuates turning the inner ring 11 to achieve two main positions: 1) an open position in which the openings of the two rings are aligned, and 2) a closed position in which the inner ring 11 is turned between about a quarter turn and about half a turn counterclockwise sealing the opening of the outer ring 12. The open position is shown in FIGS. 3C-3E, while the closed position is exemplified in FIGS. 3A and 3B. FIGS. 4A and 4B show a bottom view of the inner 11 and outer 12 rings.

A plurality of elastic snaring cords 16 are attached to the bottom side of the inner and outer rings 11 and 12. One end of each cord 16 is attached to the inner ring 11 while the other end is attached to the outer ring 12 as shown in FIG. 4A configured in the open position of the ensnaring assembly 30. Turning the handle 14 to render the assembly into the closed position reconfigures the snaring cords 16 to form only a very small opening in the center of the rings. In its open position, the device assembly is in a "ready to use" mode. With the bag 18 installed, the device would be placed over the pet waste; upon turning the handle member 14, cords 16 move the bag walls to ensnare the waste and close the bag. Attachment of the cord ends to the ring bottoms may be accomplished by snapping the ends into grooves disposed on the ring bottom surfaces; however, other attachment means such as welded attachments also fall within the scope of the present invention. The cords are made of strong elastic or bungee material that has the ability to stretch and then relax. When in the closed position, the elasticity of the cords helps keep the solid waste snared up and within the bag until such time as the outer lip is cinched for secondary sealing. With this version, the device is compact and relatively easy to carry. However, the user needs to bend down to place the bag over the droppings and ensnare them by turning the handle member which is a negative.

FIG. 5 presents a second version of the first embodiment of the assembly 40. A pair of hollow rods 22A and 22B are attached to one another across their lengths and attached to the turning bars 15 at one end and a handle member 25 is attached to the other end of the rods 22A and 22B. The rods 22A and 22B are segmented so that they can be folded as illustrated in FIG. 6A-6F. The segments may be attached to each other through hinges or other attaching means that allow easy and quick assemble and disassemble. The handle member 25 has a grip opening 24 and may be collapsed over the folded segments of rods 22A and 22B to further compact the device when not in use and is being carried by the user. The bag loop assembly 20 containing the bag 18 is attached under the ensnaring assembly 30 such that the bag is spread open under the turning bars 15. A wire or cable 17 is attached to the rim 19 and passes though one of the hollow rods 22A and 22B and coils inside the handle member 25. The other hollow rod 22A and 22B incorporates a bungee or cable held in tension by a spring, aiding in self-assembly of the boom as it is extended.

Figures 7D, 7E:
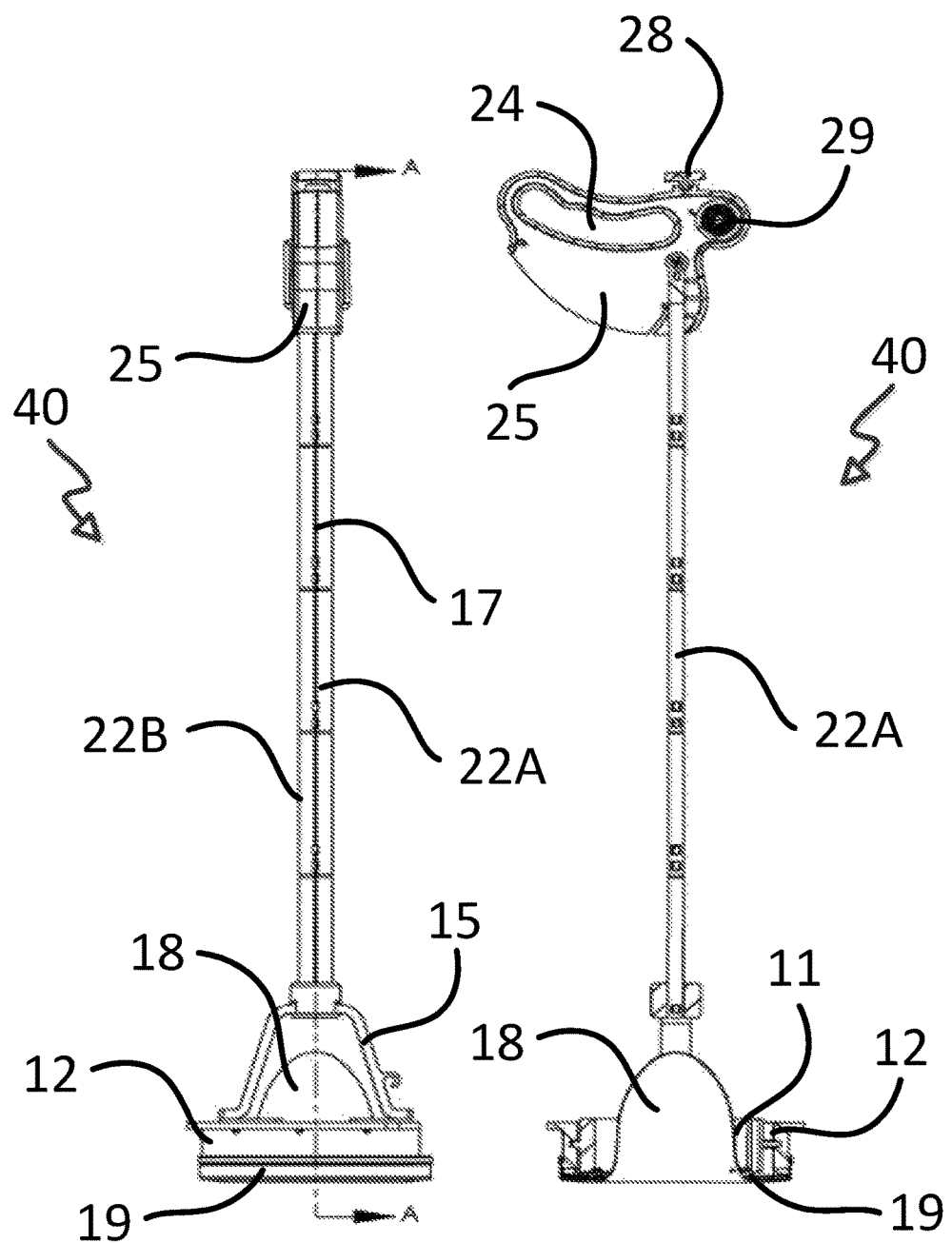

Cable 17 is used for holding the rim 19 in place as the device is placed on the ground and the inner ring 11 is turned to actuate closing of the bag 18. The handle member 25 contains a pull button 28 for the cable 17 and a spring loaded tension wheel 29 shown in FIG. 7E to maintain cable tightness when the rods 22A and 22B are folded. With this version, turning handle member 25 actuates the turning of rods 22A and 22B and rotation of the inner ring 11 relative to the outer ring 12 which results in toggling from the open to the closed position. Tab 23 attached to the handle member 25 may be used to maintain the device assembly 40 in a collapsed configuration. The lengths of the rods are configured to allow a person to operate the device 40 without bending down. The collapsible rods 22A and 22B allow the device to become compact when not in use, and also provide a conduit to manage a part of the bag closure process.

A series of LEDs 27 are disposed on a rim at the bottom of the outer ring for the purpose of illuminating the pickup area at night. The LEDs 27 are shown in FIGS. 4A and 4B.

The ready to use configuration of the device 40 is shown in FIGS. 7A-7E. With the second version of the first embodiment, the pet droppings are picked up by placing the bag 18 in the open position on the ground 33 over the pet droppings then turning the handle member to actuate moving the inner ring 11 to the closed position depicted in FIGS. 8A-8C by turning bar assembly 15. This results in pinching the bottom of the bag as the droppings 31 are snared into the bag as shown in FIGS. 9 and 10.

One mechanism for replacing the waste collection bag after use can be accomplished by the use of loop assembly 20. A new bag may be fastened to the outer ring 12 through the rim 19 fastened to the outer ring 12 using clip 13.

Figure 12:
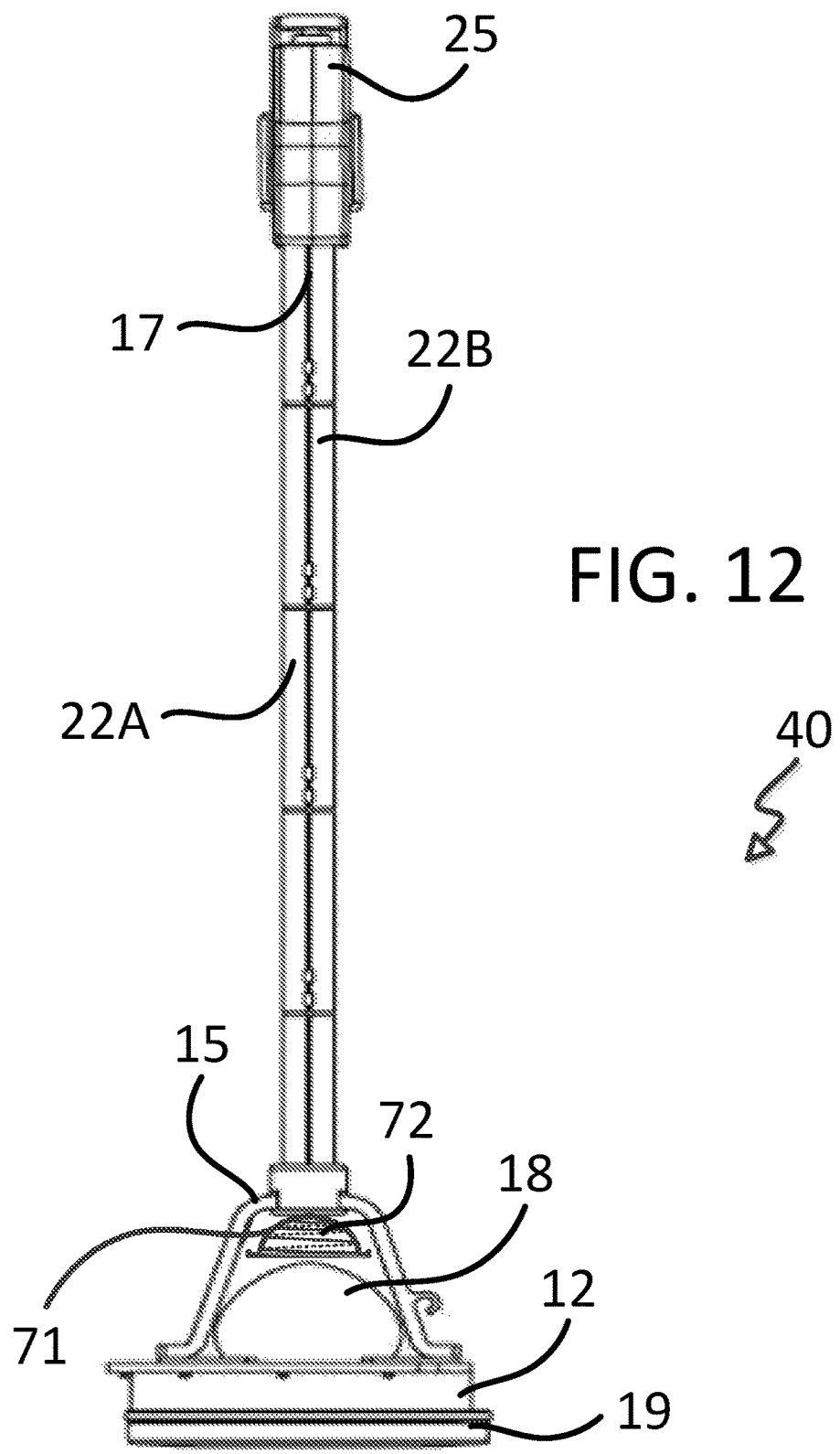
FIGS. 12-15 present components and a method of replacing the pet waste collection bag after use according to an embodiment of the present invention.
Figure 13:
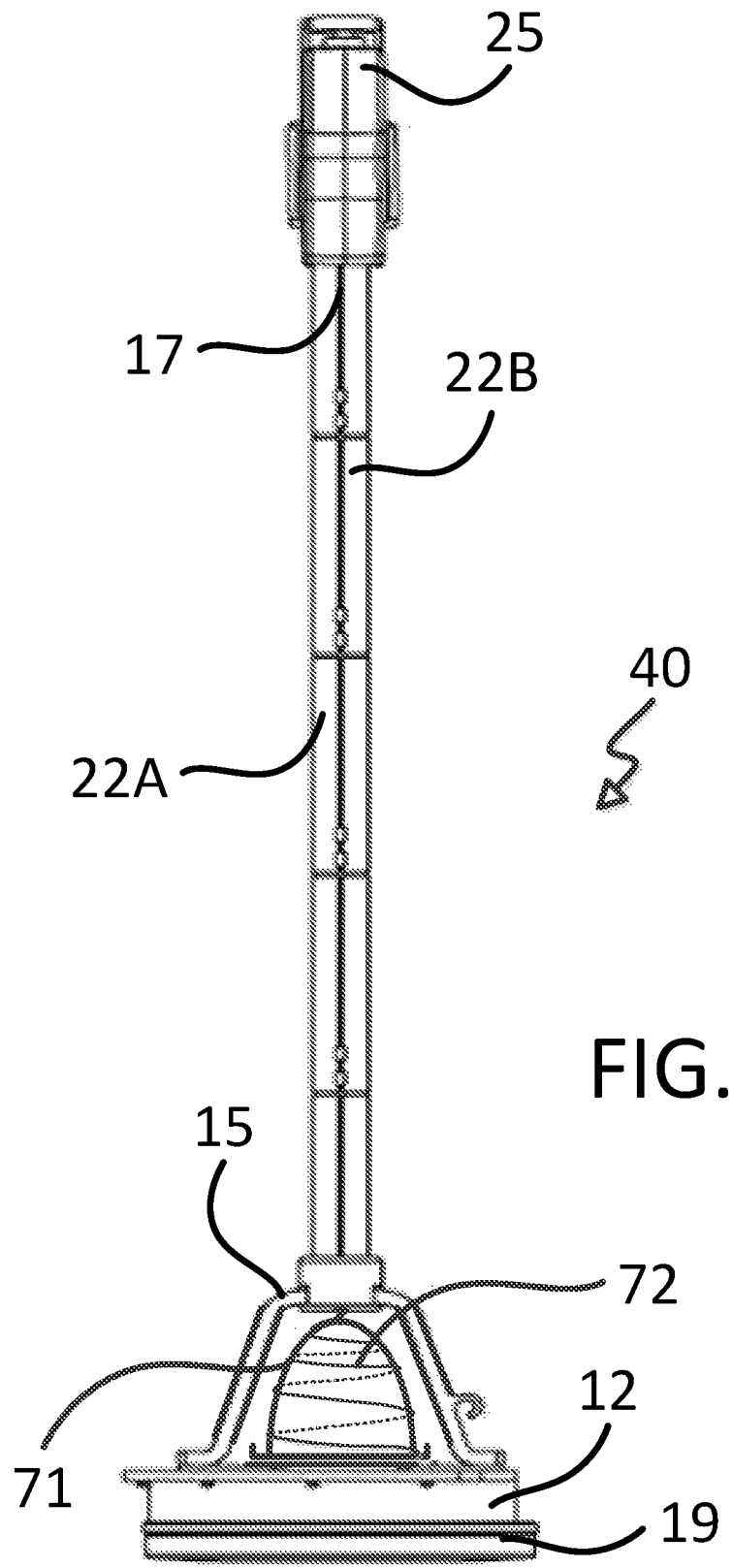
Figure 14:
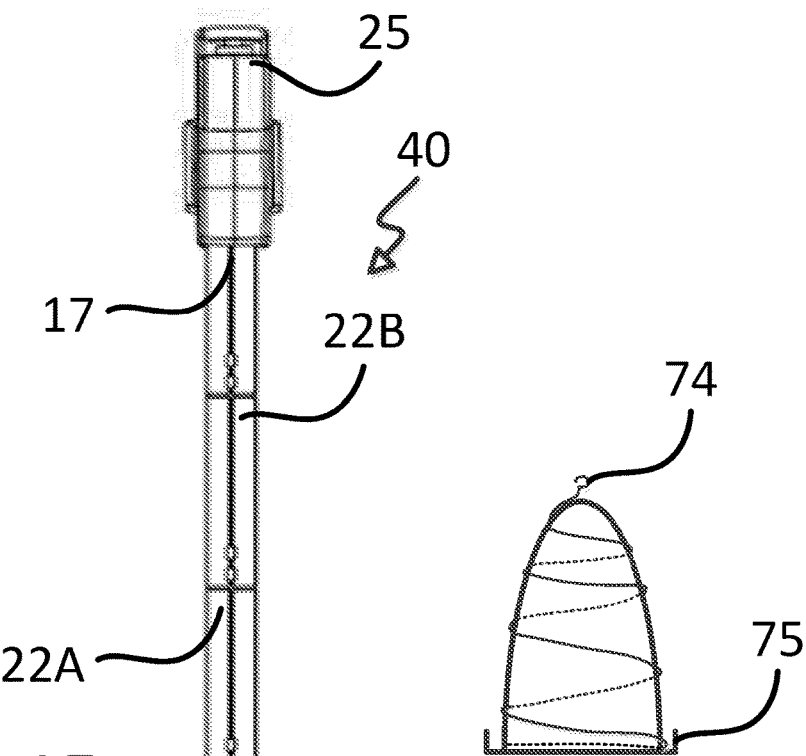
Figure 15:
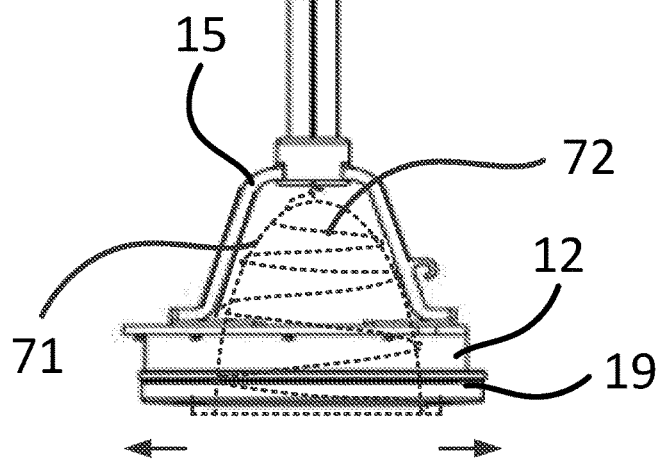

FIGS. 12-15 present another mechanism for changing the waste collection bag after the waste pickup. An expandable spiral coil 72 is attached to a top portion of turning bars 15 by way of a hook 74; however, other attachment means for the spiral coil to turning bar assembly 15 also fall within the scope of the present invention. The spiral coil 72 is manufactured of flexible material such as plastic or metal that can expand downward and laterally. The spiral coil 72 is wrapped over spare bag 71 made of a flexible material configured for downward and lateral expansion. The spare bag 71 and the spiral coil wrapped over it are configured in a compressed position above the installed and ready to use bag 18 as shown in FIG. 12. After the installed bag 18 is removed, the spiral coil 72 is pulled downward as shown in FIGS. 13-15. The bottom edge of the spare bag 71 has a pleat 75 that curves upward. The bottom of spiral coil 72 is wrapped around the pleat 75 in a way that pulling down on the spiral coil 72 expands the coil 72 both downwardly and laterally and to also move the spare bag 71 down and expand it laterally. As the last step, the pleat 75 of the spare bag is wrapped over the rim 19. Thus, the spiral coil 72 functions to help hold in place, move and expand the compressed spare bag 71 into position for installation. Once the spare bag is installed, the spiral coil 72 is released and allowed to compress back to its original form. A new spare bag is then inserted inside the spiral coil.

The second embodiment 50 of a pet collection and isolation device is portrayed in FIGS. 11A-11C. A piston 51 is configured to actuate jaws 62A and 62B by pressing on jaws actuator 53. The piston 51 is encased in tube 52 and moves hinges 54A and 54B sideways when the user applies downward pressure on the piston 51 as illustrated in FIG. 11B. Pulling the piston 51 upward closes the jaws 62A and 62B as illustrated by FIG. 11C. A bag 55 shown by a dashed line is wrapped from the outside of the jaws 62A and 62B around the jaws 62A and 62B and in between them shown by the inner jaw portion 56 also shown by a dashed line. The piston 51 has a handle 59 and the user may hold the device 50 by handle 61 with his/her other hand for leverage.

To use the device 50, the user would place jaws 62A and 62B spread apart over droppings 57 deposited on surface 58 as shown in FIG. 11B. Pulling piston 51 upwardly causes the jaws 62A and 62B and the bag 55 to close over the droppings 57 and snare the droppings 57 inside the bag 56.

The bag 55 is wrapped around the outside of the jaws 62A and 62B. The bag 55 may be made of a number of flexible yet strong materials including plastic, non-woven and paper. The bag 55 should be strong enough to keep its shape when fully spread open, yet sufficiently flexible for easy closing. The bag 55 may be secured to the outer wall of the jaws 62A and 62B by a number of means including using a rubber band and wrapping the bag 55 around a ring on the jaws 62A and 62B.

The device may further comprise illumination means attached to the bottom of the device for lighting the area of the droppings when it is dark outside. The illuminating means may use LEDs or other lighting devices.

Also within the scope of the present invention embodiments are the attachment of a strap for carrying the device and a storage pouch for carrying dog treats and whistle.

It should be understood, of course, that the foregoing relates to exemplary embodiments of the invention and that modifications may be made without departing from the spirit and scope of the invention.

We claim:

1. A device for collecting and isolating pet droppings comprising:
   a ring assembly comprising an outer ring and an inner ring, said inner ring being configured for fitting inside and rotating inside the outer ring, said outer ring having an open section and said inner ring having an open section;

a turning bar assembly attached to a top portion of the inner ring, said turning bar assembly creating a space above the ring assembly;

a handle member attached to the bar assembly, said handle member being configured for turning the inner ring;

a plurality of elastic cords, said each elastic cord having a first end and a second end, wherein the first end of each cord is attached to a groove at the bottom surface of the inner ring while the other end is attached to a groove disposed at the bottom surface of the outer ring, said cords being arranged in succession of one another; and a waste collection bag, said waste collection bag having a rim around an opening, said bag being held open by means of affixing the rim to a bottom portion of the device for collecting and isolating pet droppings, said waste collection bag having walls that occupy the space above the ring assembly, wherein turning the handle member is configured to actuate the turning bar assembly to rotate the inner ring inside the outer ring that, in turn, actuates the cords to twist the mouth of the bag, pinch the mouth of the bag and close the bag.

2. The device for collecting and isolating pet droppings of claim 1 further comprising:

a first hollow rod and a second hollow rod each having a length, said first and second rods being attached to one another along the length of said first hollow rod and second hollow rod to form a combined rod structure, said combined rod structure having a bottom end and a top end, said bottom end of the combined rod structure being attached to a top end of the bar assembly, said top end of the combined rod structure being attached to the handle member, in such a manner that a turning motion applied to the handle member is transmitted to the inner ring.

3. The device for collecting and isolating pet droppings of claim 2, wherein said first rod and said second rod are constructed from segments longitudinally attached to one another, said segments being adapted for folding to form a compact collapsed configuration, said segments being also configured for recombining into a longitudinal form.

4. The device for collecting and isolating pet droppings of claim 3, wherein the handle member is foldable over the segments of the first and second rods when said device is in a collapsed form.

5. The device for collecting and isolating pet droppings of claim 4 further comprising a tab attached to the handle member for securing the handle member in a folded form.

6. The device for collecting and isolating pet droppings of claim 4 further comprising a waste bag replacement device, said waste bag replacement device containing:

a spiral coil attached at one end to a bottom of the bar assembly, said spiral coil being configured for lateral and downward expansion;

a spare bag being configured for lateral and downward expansion, said spiral coil configured for wrapping around an outside of the spare bag, said spare bag and spiral coil being stowed in a compressed form above an installed and ready to use bag, said spare bag being configured for expanding along with an expanding spiral coil and wrap around the loop.

7. The device for collecting and isolating pet droppings of claim 6 wherein the rim of the spare bag forms an upward pleat for wrapping around the loop.

8. The device for collecting and isolating pet droppings of claim 7 further comprising a flexible band fastened onto the pleat to hold the pleat in place against the loop.

9. The device for collecting and isolating pet droppings of claim 2 further comprising an open loop attached to the bottom of the outer ring, said loop containing the waste collection bag having a mouth wrapped under the loop and having walls threaded through an inside of the outer ring and the inner ring and having the rim held in place by the loop.

10. The device for collecting and isolating pet droppings of claim 9 further comprising a clip for cinching the rim of the bag to the loop.

11. The device for collecting and isolating pet droppings of claim 9, further comprising:

a first cable attached to the loop at one end wherein another end of the first cable is threaded through the first hollow rod and into the handle member, said other end of the second cable being held by a pull button, and a second cable attached to the loop at one end wherein another end of the second cable is threaded through the second hollow rod and into the handle member, said other end of the second cable being held by a tensioning spring.

12. The device for collecting and isolating pet droppings of claim 1, further comprising illuminating means attached to a bottom of the outer ring for lighting the droppings area when it is dark.

13. A method for collecting and isolating pet droppings comprising:

placing a mouth of a bag over a surface onto which pet droppings were deposited;

turning a handle member to actuate turning a ring containing a plurality of cords, wherein movement of the ring causes the cords to twist around and pinch the mouth of the bag under the pet droppings;

snaring the droppings into the bag; and removing and disposing of the bag with the dropping.

14. The method of claim 13 wherein the handle member is attached to a top end of a rod assembly, wherein a bottom portion of the rod assembly is attached to a top end of a turning bar assembly and wherein a bottom section of the turning bar assembly is attached to the ring, said ring being held by and being configured for turning inside an enclosure.

15. The method of claim 14 wherein the bag contains walls placed in an area inside the bar assembly, said bag having an opening positioned in parallel with the ground, the bag containing a rim wrapped around the enclosure, and the mouth area surrounded by the ring.

\* \* \* \* \*